(12) United States Patent
Munhall

(10) Patent No.: US 6,338,515 B1
(45) Date of Patent: Jan. 15, 2002

(54) CARGO BED EXTENSION SYSTEM

(76) Inventor: Christopher A. Munhall, 16011 N. 35 Dr., Phoenix, AZ (US) 85053

( * ) Notice: Subject to any disclaimer, the term of this patent is extended or adjusted under 35 U.S.C. 154(b) by 0 days.

(21) Appl. No.: 09/791,216

(22) Filed: Feb. 23, 2001

(51) Int. Cl.7 .................................................. B60P 3/34
(52) U.S. Cl. ..................... 296/26.1; 296/26.08
(58) Field of Search ............................ 296/26.08, 26.1, 296/61

(56) References Cited

U.S. PATENT DOCUMENTS

| | | |
|---|---|---|
| 4,596,417 A | 6/1986 | Bennett |
| D316,771 S | 5/1991 | Murray |
| 5,518,288 A | 5/1996 | Deklotz |
| 5,752,800 A | 5/1998 | Brincks et al. |
| 5,816,638 A | 10/1998 | Pool, III |
| D417,859 S | 12/1999 | Leitner et al. |
| 6,158,797 A | * 12/2000 | Bauer |
| 6,227,593 B1 | * 5/2001 | De Valcourt |

* cited by examiner

Primary Examiner—Stephen T. Gordon
Assistant Examiner—Scott Carpenter

(57) ABSTRACT

A cargo bed extension system for allowing a user to ease the loading and unloading of equipment from a truck bed as well as increase the size of the cargo space. The cargo bed extension system includes an extension assembly that has a pair of end panels and a center panel. Each of the end panels is hingably coupled to opposite ends of the center panel. A pair of mounting assemblies each are designed for mounting to the cargo bed of the vehicle. Each of the mounting assemblies are for selectively receiving one of the end panels such that each of the end panels are designed for being secured to the cargo bed of the vehicle. A securing assembly is designed for mounting to a tailgate of the vehicle, the securing assembly is for selectively engaging the center panel of the extension assembly such that the securing assembly is designed for securing the center panel to the tailgate of the vehicle.

10 Claims, 6 Drawing Sheets

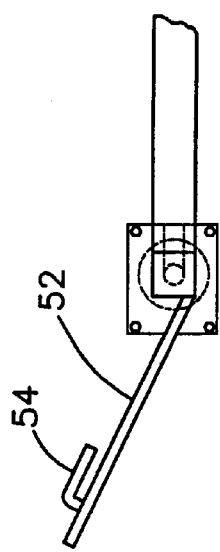
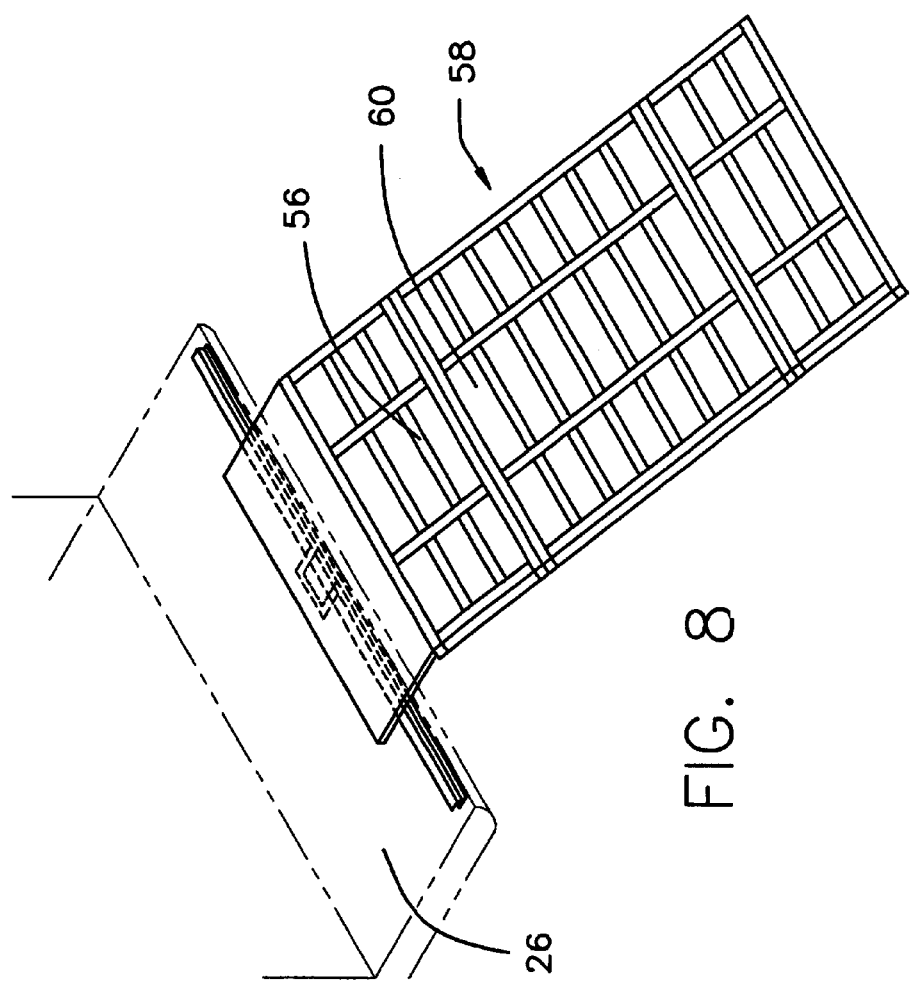
FIG. 7
FIG. 8

CARGO BED EXTENSION SYSTEM

BACKGROUND OF THE INVENTION

1. Field of the Invention

The present invention relates to cargo bed extension systems and more particularly pertains to a new cargo bed extension system for allowing a user to ease the loading and unloading of equipment from a truck bed as well as increase the size of the cargo space.

2. Description of the Prior Art

The use of cargo bed extension systems is known in the prior art. More specifically, cargo bed extension systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,752,800; U.S. Pat. No. 5,816,638; U.S. Pat. No. 4,596,417; U.S. Pat. No. 5,518,288; U.S. Pat. No. Des. 417,859; and U.S. Pat. No. Des. 316,771.

While these devices fulfill their respective, particular objectives and requirements, the aforementioned patents do not disclose a new cargo bed extension system. The inventive device includes an extension assembly that has a pair of end panels and a center panel. Each of the end panels is hingably coupled to opposite ends of the center panel. A pair of mounting assemblies each are designed for mounting to the cargo bed of the vehicle. Each of the mounting assemblies are for selectively receiving one of the end panels such that each of the end panels are designed for being secured to the cargo bed of the vehicle. A securing assembly is designed for mounting to a tailgate of the vehicle, the securing assembly is for selectively engaging the center panel of the extension assembly such that the securing assembly is designed for securing the center panel to the tailgate of the vehicle.

In these respects, the cargo bed extension system according to the present invention substantially departs from the conventional concepts and designs of the prior art, and in so doing provides an apparatus primarily developed for the purpose of allowing a user to ease the loading and unloading of equipment from a truck bed as well as increase the size of the cargo space.

SUMMARY OF THE INVENTION

In view of the foregoing disadvantages inherent in the known types of cargo bed extension systems now present in the prior art, the present invention provides a new cargo bed extension system construction wherein the same can be utilized for allowing a user to ease the loading and unloading of equipment from a truck bed as well as increase the size of the cargo space.

The general purpose of the present invention, which will be described subsequently in greater detail, is to provide a new cargo bed extension system apparatus and method which has many of the advantages of the cargo bed extension systems mentioned heretofore and many novel features that result in a new cargo bed extension system which is not anticipated, rendered obvious, suggested, or even implied by any of the prior art cargo bed extension systems, either alone or in any combination thereof.

To attain this, the present invention generally comprises an extension assembly that has a pair of end panels and a center panel. Each of the end panels is hingably coupled to opposite ends of the center panel. A pair of mounting assemblies each are designed for mounting to the cargo bed of the vehicle. Each of the mounting assemblies are for selectively receiving one of the end panels such that each of the end panels are designed for being secured to the cargo bed of the vehicle. A securing assembly is designed for mounting to a tailgate of the vehicle, the securing assembly is for selectively engaging the center panel of the extension assembly such that the securing assembly is designed for securing the center panel to the tailgate of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cargo bed extension system apparatus and method which has many of the advantages of the cargo bed extension systems mentioned heretofore and many novel features that result in a new cargo bed extension system which is not anticipated, rendered obvious, suggested, or even implied by any of the prior art cargo bed extension systems, either alone or in any combination thereof.

It is another object of the present invention to provide a new cargo bed extension system, which may be easily and efficiently manufactured and marketed.

It is a further object of the present invention to provide a new cargo bed extension system, which is of a durable and reliable construction.

An even further object of the present invention is to provide a new cargo bed extension system which is susceptible of a low cost of manufacture with regard to both materials and labor, and which accordingly is then susceptible of low prices of sale to the consuming public, thereby making such cargo bed extension system economically available to the buying public.

Still yet another object of the present invention is to provide a new cargo bed extension system which provides in the apparatuses and methods of the prior art some of the advantages thereof, while simultaneously overcoming some of the disadvantages normally associated therewith.

Still another object of the present invention is to provide a new cargo bed extension system for allowing a user to ease the loading and unloading of equipment from a truck bed as well as increase the size of the cargo space.

Yet another object of the present invention is to provide a new cargo bed extension system which includes an extension assembly that has a pair of end panels and a center panel. Each of the end panels is hingably coupled to opposite ends of the center panel. A pair of mounting assemblies each are designed for mounting to the cargo bed of the vehicle. Each of the mounting assemblies are for selectively receiving one of the end panels such that each of the end panels are designed for being secured to the cargo bed of the vehicle. A securing assembly is designed for mounting to a tailgate of the vehicle, the securing assembly is for selectively engaging the center panel of the extension assembly such that the securing assembly is designed for securing the center panel to the tailgate of the vehicle.

Still yet another object of the present invention is to provide a new cargo bed extension system that would allow a user to purchase only one product that would perform both ram and extender functions, thus reducing cost and unwanted clutter in the bed of the vehicle.

Even still another object of the present invention is to provide a new cargo bed extension system that would provide a safe and convenient means to load equipment in and out of the bed of a vehicle so accidents and damage are avoided.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 7 is a side view of the present invention.

FIG. 8 is a perspective view of the present invention.

DESCRIPTION OF THE PREFERRED EMBODIMENT

Figure 1:
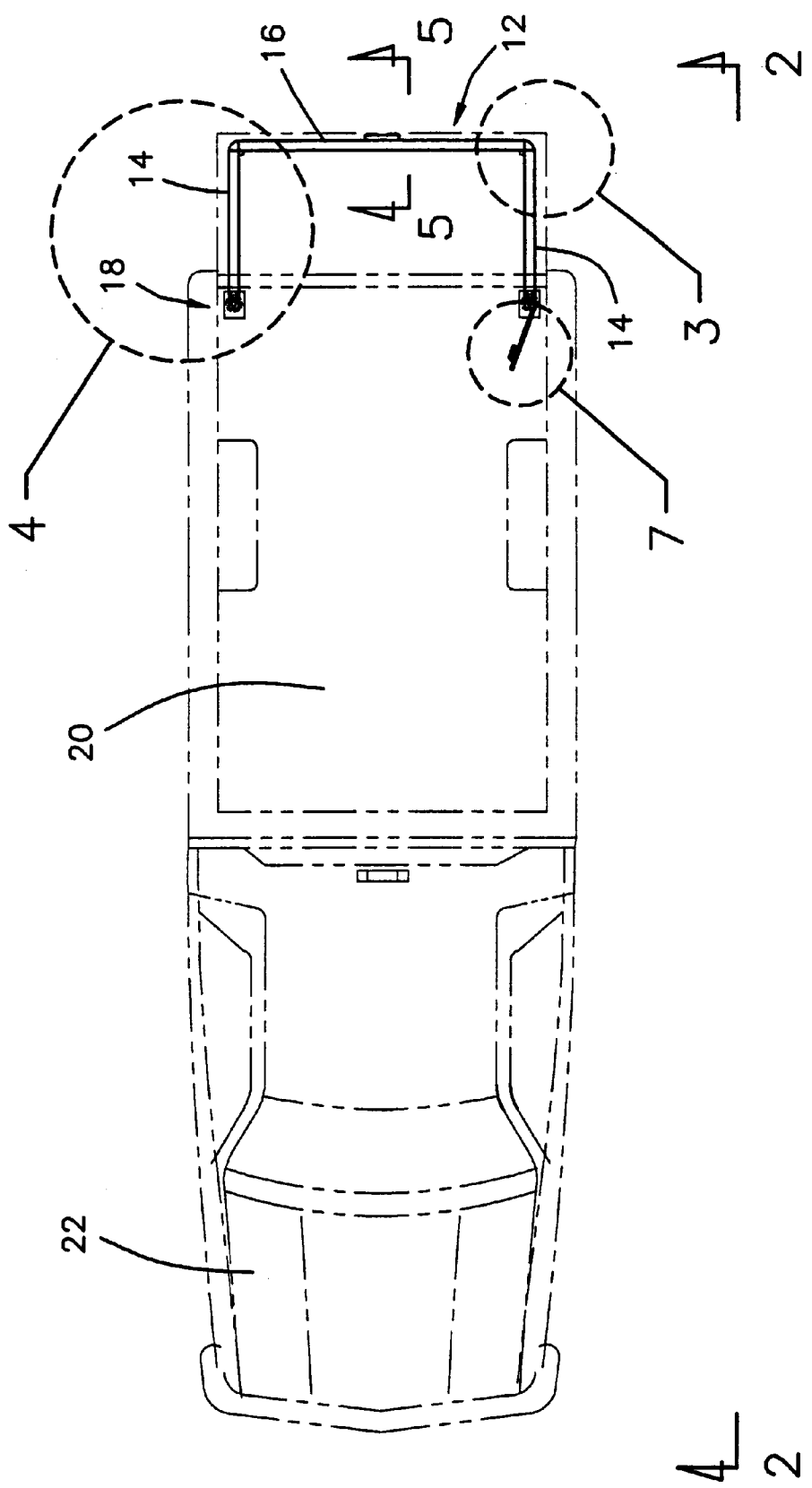
FIG. 1 is a perspective view of a new cargo bed extension system according to the present invention.
Figure 2:
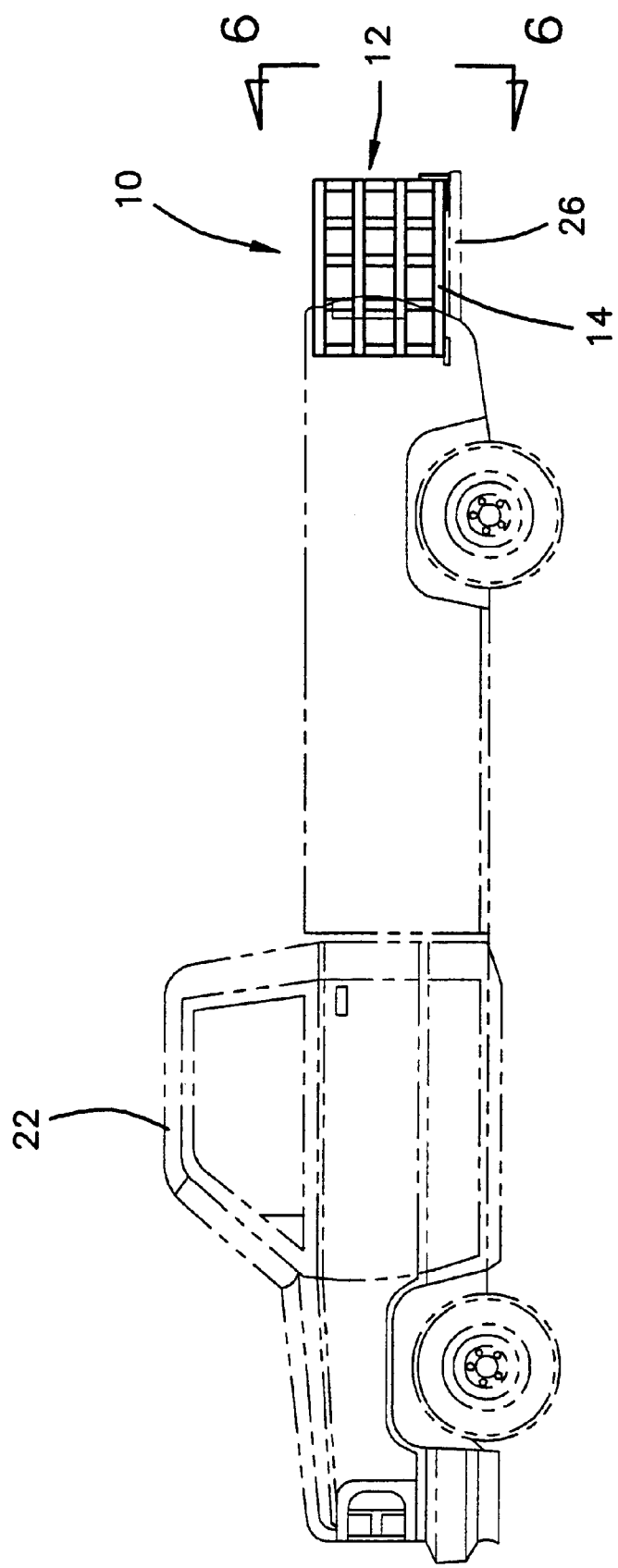
FIG. 2 is a side view of the present invention.
Figure 4:
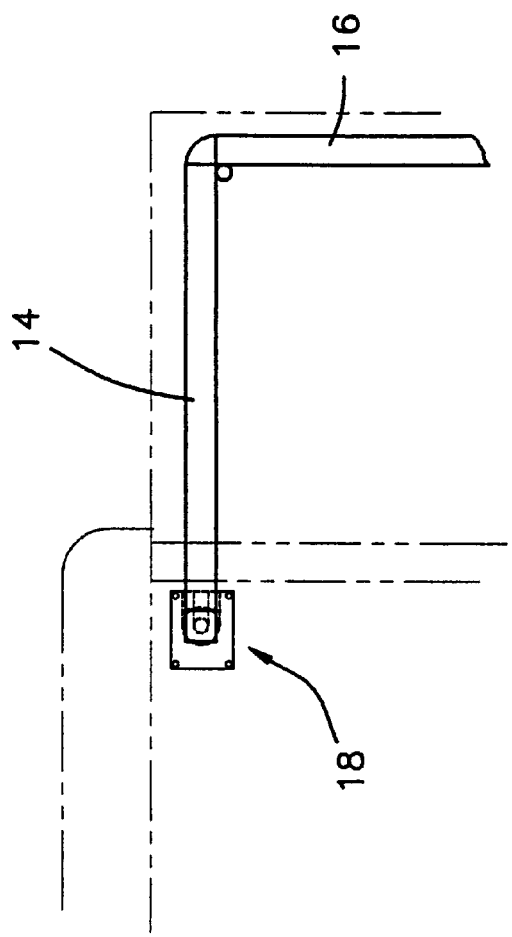
FIG. 4 is a top view of the present invention.
Figure 3:
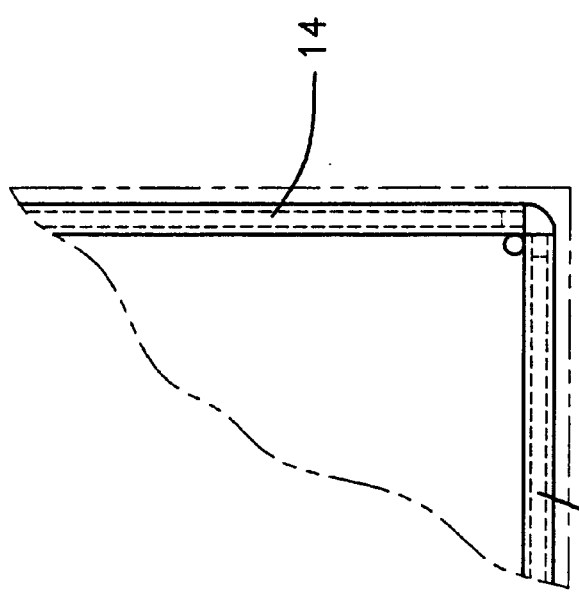
FIG. 3 is a cross-sectional view of the present invention.
Figure 5:
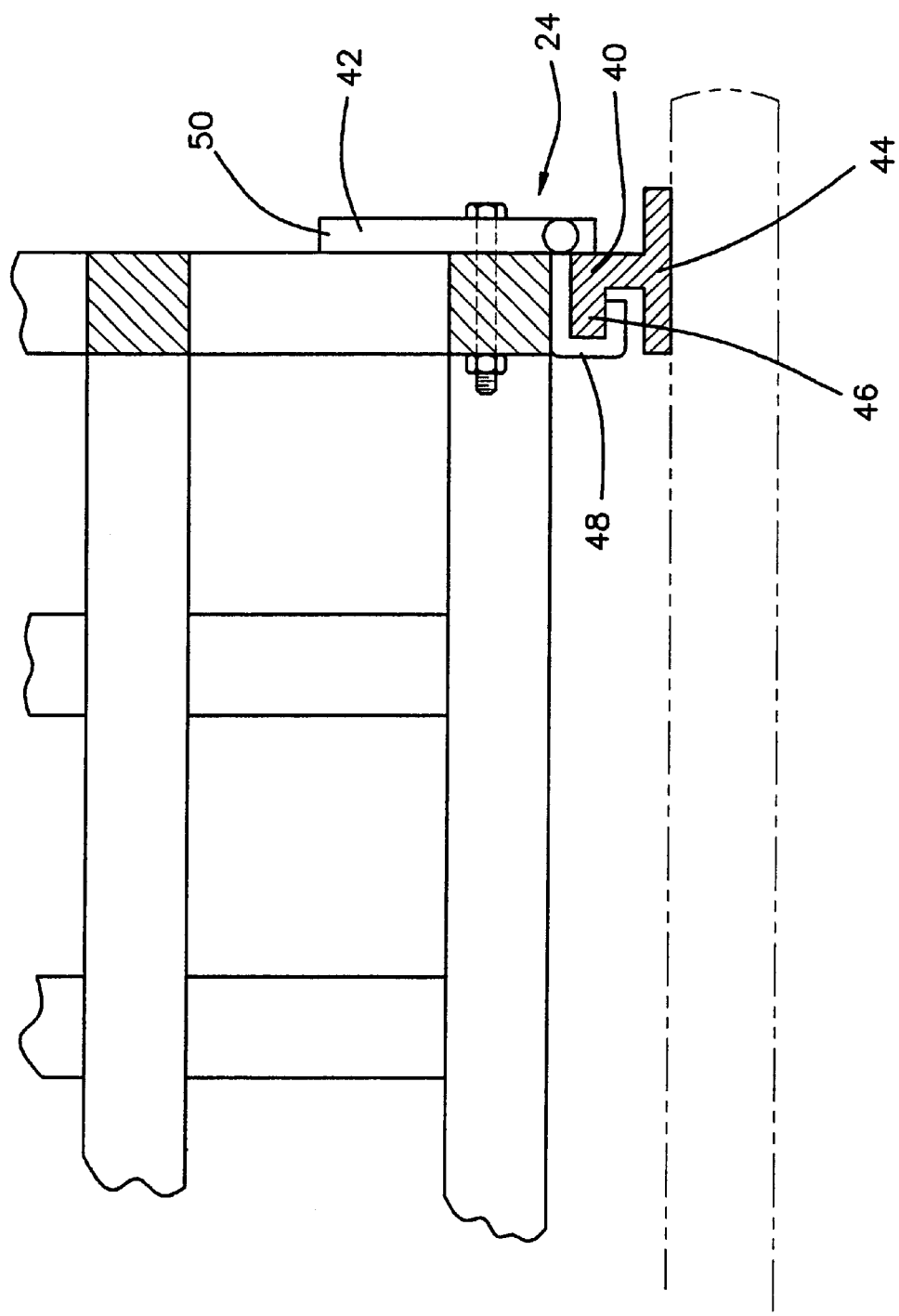
FIG. 5 is a end view of the present invention.
Figure 6:
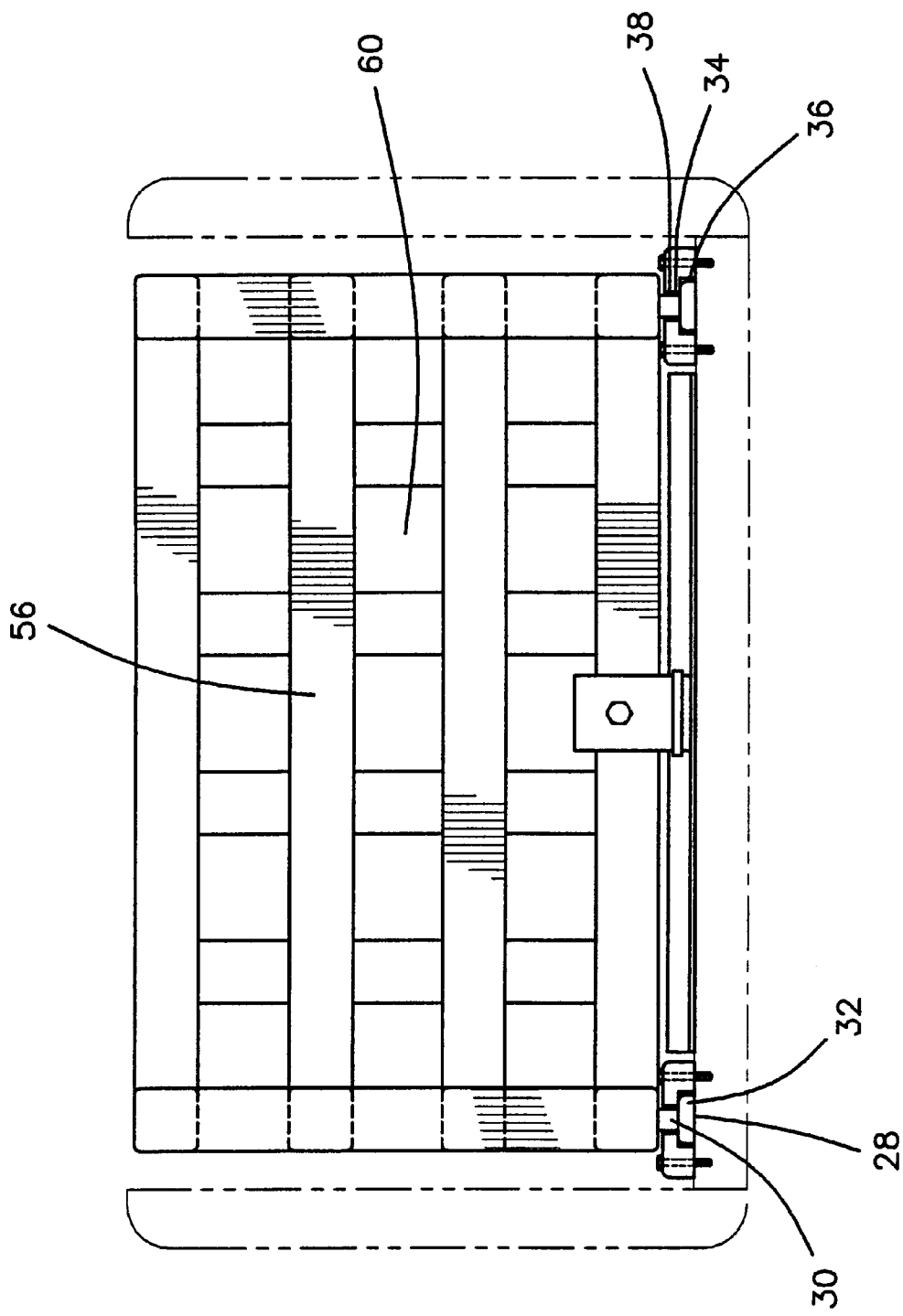
FIG. 6 is a end view of the present invention.

With reference now to the drawings, and in particular to FIGS. 1 through 8 thereof, a new cargo bed extension system embodying the principles and concepts of the present invention and generally designated by the reference numeral 10 will be described.

As best illustrated in FIGS. 1 through 8, the cargo bed extension system 10 generally includes an extension assembly 12 that has a pair of end panels 14 and a center panel 16. Each of the end panels 14 is hingably coupled to opposite ends of the center panel 16. A pair of mounting assemblies 18 each are designed for mounting to the cargo bed 20 of the vehicle 22. Each of the mounting assemblies 18 are for selectively receiving one of the end panels 14 such that each of the end panels 14 are designed for being secured to the cargo bed 20 of the vehicle 22. A securing assembly 24 is designed for mounting to a tailgate 26 of the vehicle 22, the securing assembly 24 is for selectively engaging the center panel 16 of the extension assembly 12 such that the securing assembly 24 is designed for securing the center panel 16 to the tailgate 26 of the vehicle 22.

Each of the end panels 14 has an anchor portion 28 that downwardly extends from the respective end panel 14. The anchor portion 28 is for engaging one of the mounting assemblies 18 such that the anchor portion 28 is designed for securing the respective end panel 14 to the cargo bed 20 of the vehicle 22.

The anchor portion 28 has a shaft 30 and a disk portion 32. The disk portion 32 of the anchor portion 28 has a diameter greater than a diameter of the shaft 30 of the anchor portion 28.

Each of the mounting assemblies 18 has a slot 34 that extends into the mounting assembly 18, the slot 34 has a disk receiving portion 36 and shaft receiving portion 38. The disk receiving portion 36 has a width greater than a width of the shaft receiving portion 38. The disk receiving portion 36 is for selectively receiving the disk portion 32 of the anchor portion 28 and the shaft receiving portion 38 is for selectively receiving the shaft 30 of the anchor portion 28. Each of the mounting assemblies 18 are for preventing each of the end panels 14 from vertical movement when the anchor portion 28 engages the mounting assembly 18.

The securing assembly 24 comprises a rail 40 and a mounting plate 42. The rail 40 is designed to be coupled to the tailgate 26 of the vehicle 22. The mounting plate 42 is slidably coupled to the rail 40. The mounting plate 42 is for removably coupling to the center panel 16 such that the center panel 16 is designed to be secured to the tailgate 26 of the vehicle 22. The rail 40 has a base 44 and an L-shaped distal portion 46 that upwardly extends from the base 44. The base 44 is designed to be secured to the tailgate 26 of the vehicle 22.

The mounting plate 42 has a bracket 48 for slidably receiving the distal portion 46 of the base 44. The mounting plate 42 has a securing portion 50 hingably coupled to the bracket 48. The securing portion 50 is for removably securing to the center panel 16 of the extension assembly 12 such that the securing portion 50 secures the center panel 16 to the rail 40.

A ramp member 52 is hingably coupled to a free end of one of the end panels 14, the securing portion 50 is positionable in a horizontal position such that a hook portion 54 of the ramp member 52 removably engages the securing portion 50 in the horizontal position whereby the end panels 14 and the center panels 16 are positioned coplanarly to form a ramp designed for facilitating access to the cargo bed 20 of the vehicle 22.

Each of the end panels 14 and the center panel 16 has a plurality of cross members 56 forming a grid 58. The grid 58 has a plurality of apertures 60 designed for permitting air to flow through the grid 58 when the end panels 14 and the center panel 16 are secured to the cargo bed 20 and tailgate 26 of the vehicle 22.

In use, a user would attach the present invention to the truck bed and load the cargo; when the cargo is loaded the user would then position the present invention from the ramp position to the bed extender position and attach to the top of the tailgate.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cargo bed extension system for extending a cargo bed of a vehicle, the system comprising:

an extension assembly having a pair of end panels and a center panel, each of said end panels being hingably coupled to opposite ends of said center panel;

a pair of mounting assemblies each being adapted for mounting to the cargo bed of the vehicle, each of said mounting assemblies for selectively receiving one of said end panels such that each of said end panels are adapted for being secured to the cargo bed of the vehicle;

a securing assembly being adapted for mounting to a tailgate of the vehicle, said securing assembly being for selectively engaging said center panel of said extension assembly such that said securing assembly is adapted for securing said center panel to the tailgate of the vehicle;

each of said end panels having an anchor portion downwardly extending from said respective end panel, said anchor portion being for engaging one of said mounting assemblies such that said anchor portion is adapted for securing said respective end panel to the cargo bed of the vehicle;

said anchor portion having a shaft and a disk portion, said disk portion of said anchor portion having a diameter greater than a diameter of said shaft of said anchor portion; and each of said mounting assemblies having a slot extending into said mounting assembly, said slot having a disk receiving portion and shaft receiving portion, said disk receiving portion having a width greater than a width of said shaft receiving portion, said disk receiving portion being for selectively receiving said disk portion of said anchor portion and said shaft receiving portion is for selectively receiving said shaft of said anchor portion whereby each of said mounting assemblies are for preventing each of said end panels from vertical movement when said anchor portion engages said mounting assembly.

2. The system as set forth in claim 1, wherein said securing assembly comprises a rail and a mounting plate, said rail being adapted for coupling to the tailgate of the vehicle, said mounting plate being slidably coupled to said rail, said mounting plate being for removably coupling to said center panel such that said center panel is adapted for being secured to the tailgate of the vehicle.

3. The system as set forth in claim 2, wherein said rail has a base and an L-shaped distal portion upwardly extending from said base, said base being adapted for being secured to the tailgate of the vehicle; and said mounting plate having a bracket for slidably receiving said distal portion of said base, said mounting plate having a securing portion hingably coupled to said bracket, said securing portion being for removably securing to said center panel of said extension assembly such that said securing portion secures said center panel to said rail.

4. The system as set forth in claim 3, further comprising:

a ramp member being hingably coupled to a free end of one of said end panels, said securing portion being positionable in a horizontal position such that a hook portion of said ramp member removably engages said securing portion in said horizontal position whereby said end panels and said center panels are positioned coplanarly to form a ramp adapted for facilitating access to the cargo bed of the vehicle.

5. The system as set forth in claim 1, wherein each of said end panels and said center panel have a plurality of cross members forming a grid, said grid having a plurality of apertures adapted for permitting air to flow through said grid when said end panels and said center panel are secured to the cargo bed and tailgate of the vehicle.

6. A cargo bed extension system for extending a cargo bed of a vehicle, the system comprising:

an extension assembly having a pair of end panels and a center panel, each of said end panels being hingably coupled to opposite ends of said center panel;

a pair of mounting assemblies each being adapted for mounting to the cargo bed of the vehicle, each of said mounting assemblies for selectively receiving one of said end panels such that each of said end panels are adapted for being secured to the cargo bed of the vehicle;

a securing assembly being adapted for mounting to a tailgate of the vehicle, said securing assembly being for selectively engaging said center panel of said extension assembly such that said securing assembly is adapted for securing said center panel to the tailgate of the vehicle;

each of said end panels having an anchor portion downwardly extending from said respective end panel, said anchor portion being for engaging one of said mounting assemblies such that said anchor portion is adapted for securing said respective end panel to the cargo bed of the vehicle;

said anchor portion having a shaft and a disk portion, said disk portion of said anchor portion having a diameter greater than a diameter of said shaft of said anchor portion;

each of said mounting assemblies having a slot extending into said mounting assembly, said slot having a disk receiving portion and shaft receiving portion, said disk receiving portion having a width greater than a width of said shaft receiving portion, said disk receiving portion being for selectively receiving said disk portion of said anchor portion and said shaft receiving portion is for selectively receiving said shaft of said anchor portion whereby each of said mounting assemblies are for preventing each of said end panels from vertical movement when said anchor portion engages said mounting assembly;

said securing assembly comprising a rail and a mounting plate, said rail being adapted for coupling to the tailgate of the vehicle, said mounting plate being slidably coupled to said rail, said mounting plate being for removably coupling to said center panel such that said center panel is adapted for being secured to the tailgate of the vehicle;

said rail having a base and an L-shaped distal portion upwardly extending from said base, said base being adapted for being secured to the tailgate of the vehicle;

said mounting plate having a bracket for slidably receiving said distal portion of said base, said mounting plate having a securing portion hingably coupled to said bracket, said securing portion being for removably securing to said center panel of said extension assembly such that said securing portion secures said center panel to said rail;

a ramp member being hingably coupled to a free end of one of said end panels, said securing portion being positionable in a horizontal position such that a hook portion of said ramp member removably engages said securing portion in said horizontal position whereby said end panels and said center panels are positioned coplanarly to form a ramp adapted for facilitating access to the cargo bed of the vehicle; and each of said end panels and said center panel having a plurality of cross members forming a grid, said grid having a plurality of apertures adapted for permitting air to flow through said grid when said end panels and said center panel are secured to the cargo bed and tailgate of the vehicle.

7. A cargo bed extension system for extending a cargo bed of a vehicle, the system comprising:

an extension assembly having a pair of end panels and a center panel, each of said end panels being hingably coupled to opposite ends of said center panel;

a pair of mounting assemblies each being adapted for mounting to the cargo bed of the vehicle, each of said mounting assemblies for selectively receiving one of said end panels such that each of said end panels are adapted for being secured to the cargo bed of the vehicle;

a securing assembly being adapted for mounting to a tailgate of the vehicle, said securing assembly being for selectively engaging said center panel of said extension assembly such that said securing assembly is adapted for securing said center panel to the tailgate of the vehicle; and said securing assembly comprising a rail and a mounting plate, said rail being adapted for coupling to the tailgate of the vehicle, said mounting plate being slidably coupled to said rail, said mounting plate being for removably coupling to said center panel such that said center panel is adapted for being secured to the tailgate of the vehicle.

8. The system as set forth in claim 7, wherein said rail has a base and an L-shaped distal portion upwardly extending from said base, said base being adapted for being secured to the tailgate of the vehicle; and said mounting plate having a bracket for slidably receiving said distal portion of said base, said mounting plate having a securing portion hingably coupled to said bracket, said securing portion being for removably securing to said center panel of said extension assembly such that said securing portion secures said center panel to said rail.

9. The system as set forth in claim 8, further comprising:

a ramp member being hingably coupled to a free end of one of said end panels, said securing portion being positionable in a horizontal position such that a hook portion of said ramp member removably engages said securing portion in said horizontal position whereby said end panels and said center panels are positioned coplanarly to form a ramp adapted for facilitating access to the cargo bed of the vehicle.

10. The system as set forth in claim 7, wherein each of said end panels and said center panel have a plurality of cross members forming a grid, said grid having a plurality of apertures adapted for permitting air to flow through said grid when said end panels and said center panel are secured to the cargo bed and tailgate of the vehicle.

* * * * *